(12) United States Patent
Yadav et al.

(10) Patent No.: US 11,669,405 B2
(45) Date of Patent: Jun. 6, 2023

(54) LEVERAGING METADATA TO MANAGE THE EXPIRATION OF OBJECTS STORING INCREMENTAL BACKUP DATA

(71) Applicant: EMC IP Holding Company LLC, Hopkinton, MA (US)

(72) Inventors: Sunil Yadav, Bangalore (IN); Shelesh Chopra, Bangalore (IN); Ravi Vijayakumar Chitloor, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 17/374,653

(22) Filed: Jul. 13, 2021

(65) Prior Publication Data
US 2022/0382639 A1    Dec. 1, 2022

(30) Foreign Application Priority Data
May 28, 2021   (IN) .............................. 202141023822

(51) Int. Cl.
| | |
|---|---|
| *G06F 11/14* | (2006.01) |
| *G06F 16/28* | (2019.01) |
| *G06F 16/23* | (2019.01) |
| *G06F 16/11* | (2019.01) |

(52) U.S. Cl.
CPC ...... *G06F 11/1451* (2013.01); *G06F 11/1461* (2013.01); *G06F 11/1469* (2013.01); *G06F 16/122* (2019.01); *G06F 16/23* (2019.01); *G06F 16/289* (2019.01); *G06F 2201/80* (2013.01); *G06F 2201/82* (2013.01)

(58) Field of Classification Search
None
See application file for complete search history.

(56) References Cited

U.S. PATENT DOCUMENTS

| | | | |
|---|---|---|---|
| 9,235,606 B1 * | 1/2016 | Mooney | .................. G06F 16/21 |
| 2013/0325810 A1 * | 12/2013 | Elder | .................... G06F 16/219 |
| | | | 707/645 |

* cited by examiner

*Primary Examiner* — Belix M Ortiz Ditren
(74) *Attorney, Agent, or Firm* — Dergosits & Noah LLP; Todd A. Noah

(57) ABSTRACT

Described is a system for managing the expiration of objects storing incremental backup data by leveraging specialized metadata. The system may provide a layer of intelligence when freeing up storage space on an object storage to ensure that a full recovery of client backup data may be performed when storing incremental backup data. The system may maintain metadata indicating the latest and/or earliest backups that reference particular objects. The system may then leverage this information to mark particular objects for removal (e.g. deletion or re-tiering). For example, the system may access the metadata to identify which objects stored by a previous (e.g. expired) backup are still referenced by a subsequent (e.g. non-expired) backup. As a result, the system may ensure that objects are not removed prematurely and that a full recovery of the client data to a point-in-time of any incremental backup may be performed.

20 Claims, 5 Drawing Sheets

400

```
┌─────────────────────────────────────────────────────────────┐
│ Perform a first backup of client data at a first point-in-  │
│ time including a first file and a second file, the first    │─ 401
│ backup including creating a first object to store a backup  │
│ of the first file and a second object to store a backup of  │
│ the second file                                             │
└─────────────────────────────────────────────────────────────┘
                              ↓
┌─────────────────────────────────────────────────────────────┐
│ Update a metadata database, in response to the first        │
│ backup, to indicate the first backup as a latest backup to  │─ 402
│ reference the first object, and the second object           │
└─────────────────────────────────────────────────────────────┘
                              ↓
┌─────────────────────────────────────────────────────────────┐
│ Perform a second backup of the client data at a second      │
│ point-in-time including a new third file, the second backup │─ 403
│ including creating a third object within the object storage │
│ to store a backup of the third file                         │
└─────────────────────────────────────────────────────────────┘
                              ↓
┌─────────────────────────────────────────────────────────────┐
│ Update the metadata database, in response to the second     │
│ backup, to indicate the second backup as the latest backup  │─ 404
│ to reference the second object, and the third object        │
└─────────────────────────────────────────────────────────────┘
                              ↓
┌─────────────────────────────────────────────────────────────┐
│ Obtain an expiration time associated with the performed     │─ 405
│ backups, the expiration time used to free up storage space  │
│ on the object storage                                       │
└─────────────────────────────────────────────────────────────┘
                              ↓
┌─────────────────────────────────────────────────────────────┐
│ Identify the first backup as expired based on a             │─ 406
│ determination the first point-in-time precedes the          │
│ expiration time                                             │
└─────────────────────────────────────────────────────────────┘
                              ↓
┌─────────────────────────────────────────────────────────────┐
│ Identify, amongst the objects created during the first      │
│ backup, the first object as expired based on a determination│─ 407
│ the latest backup to reference the first object is the      │
│ expired first backup                                        │
└─────────────────────────────────────────────────────────────┘
                              ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Mark the first object for re-tiering or deletion, in        │─ 408
│ response to identifying the first object as expired         │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 4

LEVERAGING METADATA TO MANAGE THE EXPIRATION OF OBJECTS STORING INCREMENTAL BACKUP DATA

CLAIM OF PRIORITY

This application claims priority to India Patent Application No. 202141023822, filed May 28, 2021, the contents of which is hereby incorporated by reference in their entirety.

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. As part of the data protection and recovery infrastructure, clients may rely on third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be stored as part of the incremental backup. Accordingly, backup data from previous backups may need to be preserved on the object storage to perform a full data recovery. However, managing and tracking data relationships between different backups becomes increasingly difficult. For example, as part of a data management policy, backup data may expire thereby freeing up storage space on the object storage to reduce storage costs. The native expiration management tools provided by the object storage, however, may not adequately account for backup data being stored as part of an incremental backup infrastructure. As a result, there exists the potential for backup data to be removed prematurely from the object storage such that the ability to perform a full recovery from the incremental backup data may be jeopardized. Accordingly, there is a continued need to efficiently manage incremental backup data stored on a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 4 is a flow diagram illustrating an example method of identifying expired objects for removal according to one or more embodiments of the disclosure

DETAILED DESCRIPTION

Figure 1:
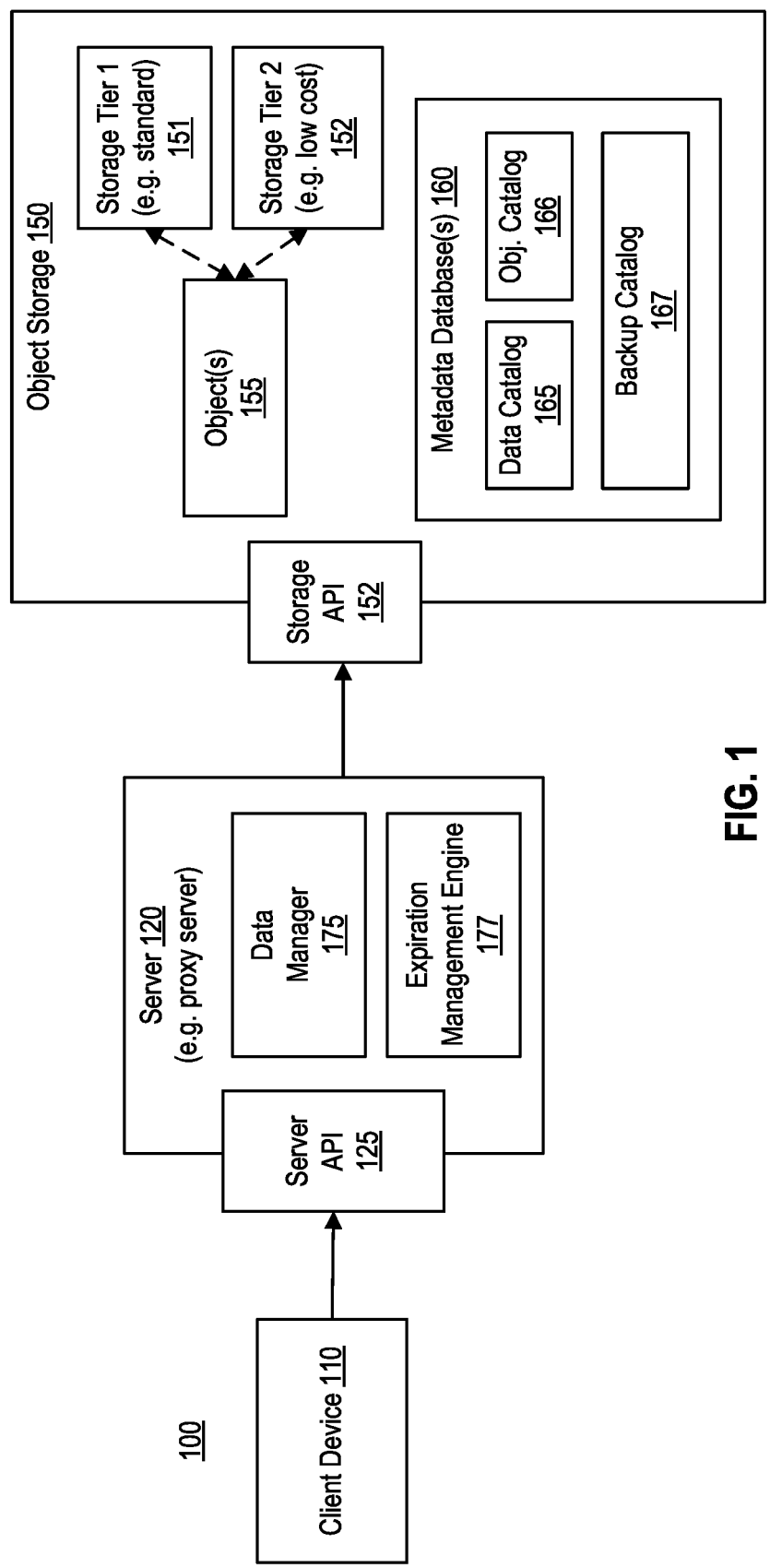
FIG. 1 is a block diagram illustrating an example of an operating environment that may be used in conjunction with one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for managing the expiration of objects storing incremental backup data by leveraging specialized metadata. More particularly, the system may provide a layer of intelligence when freeing up storage space on an object storage to ensure that a full recovery of client backup data may be performed. In some embodiments, the system may be implemented as part of an incremental backup infrastructure. For example, in order to conserve storage space, a backup service may perform incremental backups when storing client backup data to the object storage. However, the backup application may perform a full restore of the client data to a point-in-time of any incremental backup by reconstructing (e.g. synthetically) the client data as if a full backup was performed. Accordingly, the system may manage expired objects such that the system retains the ability to perform such a reconstruction. Accordingly, instead of merely relying on native expiration management tools provided by a cloud-based object storage, the system may store specialized metadata when determining which objects may be marked for removal (e.g. deletion or re-tiering). For example, the system may maintain metadata indicating the latest and/or earliest backups that reference particular objects. Accordingly, the system may leverage this information to mark particular objects for removal. For example, the system may access the metadata to identify which objects stored by a previous (e.g. expired) backup are still referenced by a subsequent (e.g. non-expired) backup. As a result, the system may ensure that objects are not removed from the object storage prematurely and that a full recovery of the client data to a point-in-time of any incremental backup may be performed.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g. depending on the cloud-based storage provider). For example, these containers or buckets may be associated with a policy that determines what actions can be performed in association with the objects stored therein. As shown, the object storage 150 may include various storage tiers including storage tier 1 151, and storage tier 2 152. Accordingly, objects 155 (e.g. backed up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs. For example, storage tier 1 151 may be a standard (or high performance) storage tier that is associated with a first storage cost (or cost per unit of storage), and storage tier 2 152 may be an archival or low-cost storage tier that is associated with a second storage cost (or cost per unit of storage). For example, the storage cost (e.g. GB/month) associated with storage tier 2 152 may be lower than the storage cost associated with storage tier 1 151. Thus, efficiently storing data on a lower tier storage may provide substantial cost savings to a subscriber (e.g. a backup service provider, or user) of the cloud-based storage service. For example, storage tier 1 151 may have a cost of 2.3 cents (or $0.023) per GB/month, while storage tier 2 152 may have a cost of 0.4 cents (or $0.004) per GB/month. Accordingly, re-tiering data to storage tier 2 152 would result in a significant reduction in storage costs. It should be noted that other storage costs (or fees) such as access fees or bandwidth fees may also be reduced using a lower cost storage tier. In addition, although only two storage tiers are shown, additional storage tiers with varying costs are also contemplated.

The client device 110 may use the server 120 as an intermediary for managing client backup data stored on the object storage 150. In some embodiments, the server 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for deleting and/or re-tiering data (e.g. objects) stored on the object storage 150. For example, a re-tiering operation may move an object from a first storage tier (e.g. storage tier 1 151) to a second (or lower) storage tier (e.g. storage tier 2 152). It should be noted that the same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed-up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as default expiration times for backups and/or data stored as part of a backup. In addition, the data manager 175 may direct (or control, initiate, etc.) other components of the operating environment 100 to perform various processes as further described herein.

The server 120 may also include an expiration management engine 177 (or manager, component, etc.). The engine 177 may work in conjunction with, or be part of, the data manager 175. The engine 177 may analyze expiration times associated with backups and/or objects to manage the removal of expired data. In addition, the engine 177 may update metadata associated with objects 155 and/or backups that is used to manage such expirations.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 152. In addition, portions of the metadata database may be cached on a memory (or storage) of the server 120 to further improve performance of various backup or restore operations.

The metadata database 160 may store metadata associated with client data stored on the client device 110 and/or backed up to the object storage 150. The metadata database 160 may also store various types of backup information associated with the backed-up client data and/or backups performed.

For example, the metadata database 160 may include a data catalog (or table, database, index, etc.) 165. The data catalog 165 may store information associated with the data stored as part of each backup. For example, the information may include a point-in-time the client data was backed up, a storage location of the backed-up client data (including storage tier), an object ID to which the backed-up client data is stored, and various other types of information. Accordingly, a data catalog 165 (or instance thereof) may be updated after each backup is performed. In some embodiments, the data catalog 165 may be maintained for a particular account (e.g. user, client, customer, etc.) associated with the object storage 150. The data catalog 165 may also store various types of backup information associated with the backed-up client data.

The metadata database 160 may include an object catalog (or table, database, index, etc.) 166 that stores information associated with the objects 155. For example, the information may include the point-in-time the object was created, data such as data IDs of backup data stored by the object, data offsets of data stored within the object, a storage location of the object, and other types of information that may be associated with an object such as the earliest and latest backup that references a particular object as further described herein.

The metadata database 160 may also include a backup catalog (or index, table, database, etc.) 167 that stores information associated with each backup performed to the object storage 150. For example, the backup catalog 167 may include backup times specifying when each backup was performed, a backup expiration time, a type of backup (e.g. full or incremental), and any other information that may be associated with performing a backup. In addition, the backup catalog 167 may also include a list of objects required to perform a full restore to each of the backup times.

Figure 2:
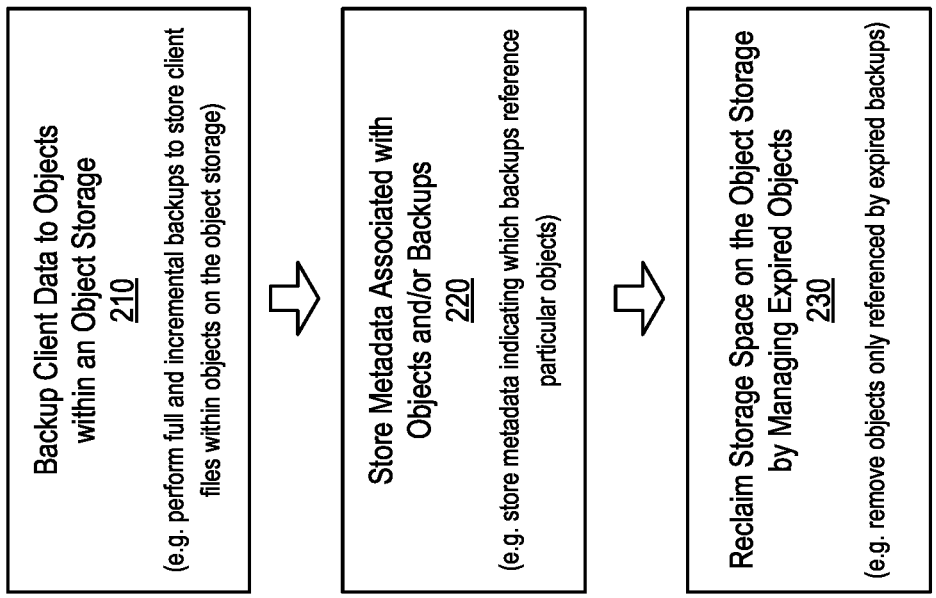
FIG. 2 is a process flow diagram illustrating a general overview for managing the expiration of objects storing incremental backup data according to one or more embodiments of the disclosure.

FIG. 2 is a process flow diagram 200 illustrating a general overview for managing the expiration of objects storing incremental backup data according to one or more embodiments of the disclosure.

In 210, a system (e.g. server 120) may backup client files (e.g. data) stored on a client device (e.g. client device 110) to objects (e.g. objects 155) within an object storage (e.g. object storage 150). The system may perform backups of client files in response to receiving a request to perform a backup of the client data. For example, the request may be from a user (e.g. backup administrator) or from a backup application (e.g. as part of a scheduled backup procedure).

When performing a backup, the system may perform either a full backup or an incremental backup. A full backup may include the system storing all of the client data at a particular point-in-time to the object storage. For example, the system may determine that the client data has not been previously backed up, and accordingly, may initiate the full backup. As another example, the system may determine that a full backup, to be performed intermittently between incremental backups, is scheduled to be performed. An incremental backup (also referred to as a differential incremental backup) may include storing only the changes to the client data since the previous backup. For example, the system may determine the changes (or delta) to client data between the point-in-time of the previous backup (e.g. full or incremental backup) and the point-in-time of the current backup. As part of the incremental backup, the system may store the new data within one or more new objects on the object storage and retain the previously backed up data within the objects already stored on the object storage. In addition, as part of the incremental backup, the system may store specialized metadata in conjunction with performing a backup.

More specifically, in 220, the system may store specialized metadata associated with the objects and/or performed backups within a metadata database (e.g. metadata database 160). This metadata may include information that may be relied upon when managing the expiration of objects within the object storage. The metadata may indicate which backups reference particular objects. For example, the specialized metadata may include the earliest and latest backups to reference a particular object as further described herein.

In 230, the system may reclaim storage space on the object storage by managing expired objects. In particular, the system may efficiently retrieve (e.g. look up) the specialized metadata to determine whether certain expired objects may be deleted without unduly hindering the ability to perform a full restore from the incremental backup data. For example, the system may only delete objects that are referenced by expired backups. For instance, objects from expired backups that store files that have been subsequently deleted from the client device may be marked for removal. Accordingly, the storage space associated with such marked objects may be reclaimed. An example of the specialized metadata that may be stored and leveraged by the system is further described with reference to FIG. 3.

Figure 3:
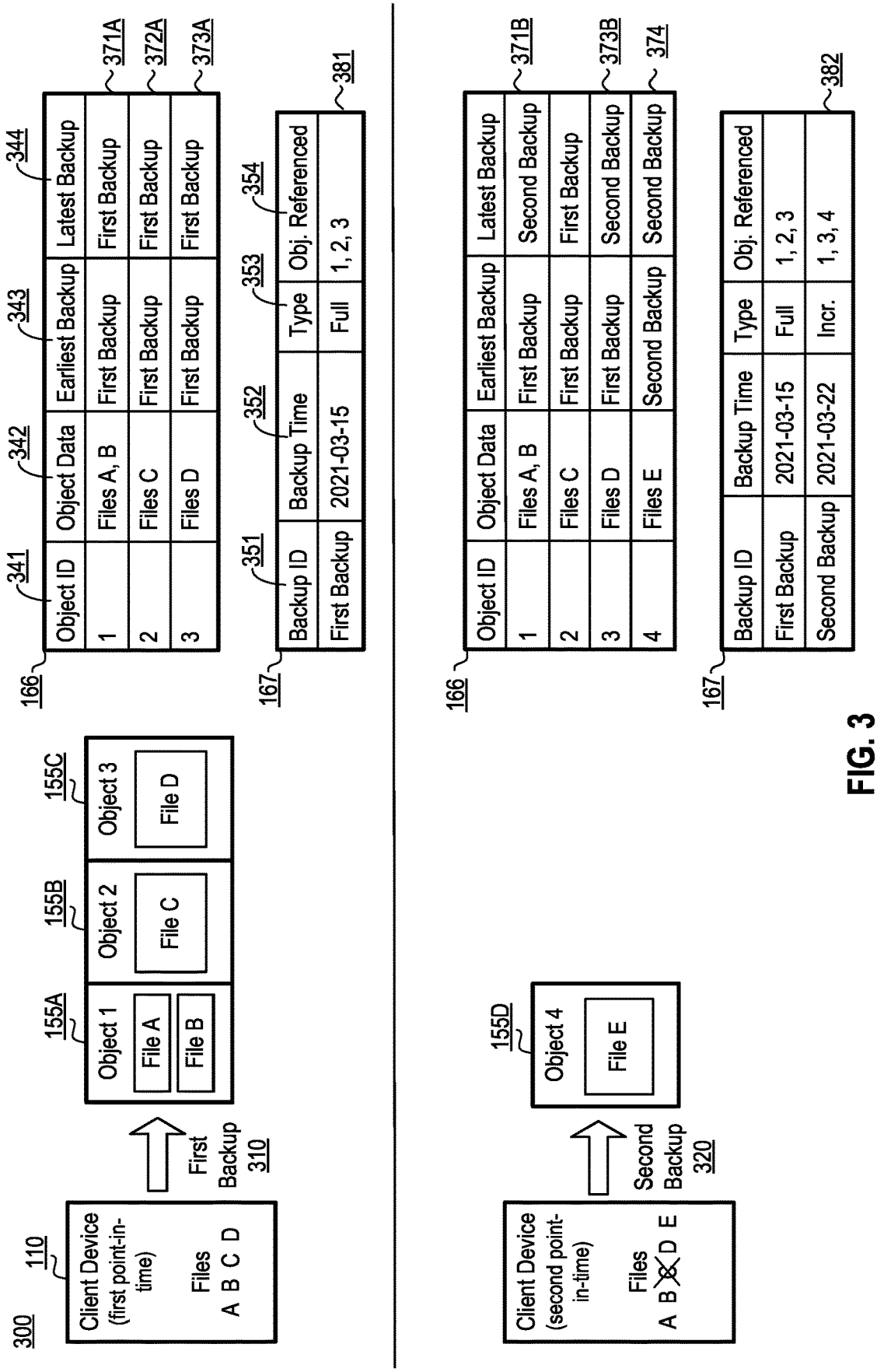
FIG. 3 is a diagram illustrating a data configuration when managing the expiration of objects according to one or more embodiments of the disclosure.

FIG. 3 is a diagram 300 illustrating a data configuration when managing the expiration of objects according to one or more embodiments of the disclosure. More particularly, diagram 300 shows an example data configuration including storing backup data within one or more objects 155 and metadata within an object catalog 166 and backup catalog 167. In this example, the client data includes files although any type of data is contemplated. As shown, the client device 110 at a first point-in-time stores files A, B, C, and D. Accordingly, as part of the first backup 310, which in this example is a full backup, the server stores the files within newly created objects 1, 2, and 3 (e.g. objects 155A, 155B, and 155C respectively) of the object storage. In other words, objects 1, 2, and 3 may be associated with the first backup 310 and/or the first point-in-time. In some embodiments, each object 155 may be configured to store a certain amount of data that is specialized for the type of data to be backed up. For example, each of the objects 155 may be configured to store an amount of data that is specialized for client files (e.g. approximately 4 MB). Accordingly, to efficiently utilize storage space on the object storage, the server may perform a packing (or grouping, combining, etc.) of data based on the amount of data an object 155 is configured to store. Thus, in this example, the server may attempt to pack files into each of the objects 155 such that each object stores approximately 4 MB of data. For example, the server may store (e.g. pack) files A and B, which are approximately 2 MB each in size, within object 155A, and files C and D, which are approximately 4 MB each in size, within objects 155B and object 155C respectively.

As shown, the server may store specialized metadata associated with each object (e.g. objects 155A, 155B, and 155C). For example, metadata associated with each object may be stored as part of an object catalog 166. In addition, the metadata may include information associated with each backup. For example, metadata associated with each backup may be stored as part of a backup catalog 167. In some embodiments, all of this metadata may be stored within a metadata database (e.g. metadata database 160).

As shown, the object catalog 166 may store various types of information including an object identifier (ID) 341, object data 342, an earliest backup 343, and a latest backup 344. The object ID 341 may uniquely identify an object storing client backup data. The object data 342 may identify the client backup data (e.g. files in this example) stored in the corresponding object. The earliest backup 343 may identify the earliest backup that references the corresponding object. For example, the earliest backup may correspond to the backup that initially stored the corresponding object. The latest backup 344 may identify the latest (or most recent) backup that references the corresponding object. For example, the latest backup may correspond to the most recent incremental backup that would need to retrieve the data from the corresponding object in order to perform a full restore. As referred to herein, in some embodiments, objects referenced by a particular backup indicate those objects that are required to perform a full recovery to the point-in-time of that backup. Examples of referenced objects are described further herein.

The object catalog 166 may include additional information. In some embodiments, the object catalog 166 may also include an expiration time (not shown). The expiration time may be user-configurable and may indicate when the corresponding object is deemed expired. For example, the expiration time may identify the time at which the corresponding object may be removed from the object storage to free up storage space. However, as described, in some embodiments, the system may only mark expired objects for removal when they are not referenced by subsequent backups, or when the object is only referenced by expired backups. Upon expiration of an object, a removal may include the object being deleted from the object storage. As another example, upon expiration of an object, the removal may include moving the object to a different storage tier (e.g. archival storage tier). In other words, removal of an object may include operations intended to free up storage space on the object storage to reduce potential storage costs incurred by a client.

In some embodiments, the server may update the backup catalog 167 in response to each backup performed. As shown, the backup catalog 167 may include a backup identifier (ID) 351, a backup time 352, a backup type 353, and a referenced object list 354. The backup ID 351 may uniquely identify the performed backup. In some embodiments, the backup ID 351 may be linked to (or referenced by, associated with, etc.) entries in the object catalog 166. For example, the backup ID 351 of entry 381 corresponds to the first backup 310, and thus, may be linked to entries 371-373 of the object catalog 166. The backup time 352 may be a time associated with the performed backup. For example, the backup time 352 may be a point-in-time of when the backup was performed. The backup type 353 may indicate whether the backup performed was a full or incremental backup. The referenced object list 354 may include a list of objects referenced by a particular backup. For example, the objects referenced by a particular backup indicate which objects are required to perform a full recovery to the point-in-time of the corresponding backup.

In some embodiments, a backup may be associated with an expiration time. The expiration time may be based on the backup time (e.g. backup time 352). In some embodiments, the expiration time may be a default expiration time. For example, the expiration time may be 3 months from the backup time 352.

Returning to the example shown, in response to performing the first backup 310, the server may update the object catalog 166. More specifically, as shown, the server may store (or add, create, update, etc.) entries 371A-373A within the object catalog 166 that correspond to objects 1, 2, and 3 (e.g. objects 155A, 155B, and 155C respectively). Entry 371A corresponds to object 1, and as shown, identifies object 1 as the object ID 341, identifies files A, and B as the object data 342, identifies the first backup as the earliest backup 343, and identifies the first backup as the latest backup 344. Since object 1 has been initially created by the first backup 310, at this point-in-time (e.g. first point-in-time), the earliest backup to reference object 1 is naturally the first backup 310. In addition, at this point-in-time, because no subsequent backups have been performed, the first backup 310 is also the latest backup to reference object 1. Continuing with the updates to the object catalog 166 based on the first backup 310, entries 372A, and 373A correspond to objects 2, and 3 respectively, and as shown, identify objects 2, and 3 respectively as the object IDs 341, identify files C, and D respectively as the object data 342, identify the first backup as the earliest backup 343, and identify the first backup as the latest backup 344. Again, because objects 2, and 3 were created by the first backup 310, and subsequent backups have not yet been performed, the first backup 310 is the earliest and the latest backup to reference objects 2, and 3.

In addition, the server may also update metadata associated with the backup within the backup catalog 167, in response to performing the first backup 310. More specifically, as shown, the server may update the backup catalog 167 to include (or add, create, etc.) entry 381, which is associated with the first backup 310. As shown, entry 381 specifies the first backup (e.g. backup 310) as the backup ID 351, 2021-03-15 as the backup time 352, a full backup as the backup type 353, and objects 1, 2, and 3 (e.g. objects 155A, 155B, and 155C respectively) as the referenced object list 354. In other words, to perform a full recovery of the client data to the point-in-time associated with the first backup 310 (e.g. the restoration of files A, B, C, and D), the referenced object list 354 indicates that the server would need to retrieve the data stored in objects 1, 2, and 3.

After the first backup 310, the server may perform a second backup 320. In this example, since the first point-in-time, the changes to the files stored by the client device 110 include the deletion of file C, and the addition of new file E. Accordingly, the client device 110 at a second point-in-time stores files A, B, D, and new file E. Thus, as part of the second backup 320, which in this example is an incremental backup, the server may store only new file E within newly created object 4 (e.g. object 155D). As shown, object 4 only stores file E, and the previously backed up files (e.g. files A-D) are retained within objects 1, 2, and 3 (e.g. objects 155A, 155B, and 155C respectively). In other words, the data of objects 1, 2, and 3 are not copied to additional objects (e.g. object 4 155D) as part of the second backup 320. Instead, when a full recovery to the second point-in-time is required, the server may combine the data of the referenced objects to create a complete dataset (e.g. files A, B, D, and E).

Accordingly, in response to performing the second backup 320, the server may update the object catalog 166. More specifically, as shown, the server may add entry 374 that corresponds to new object 4 (e.g. object 155D) within the object catalog 166. Entry 374 corresponds to object 4, and as shown, identifies object 4 as the object ID 341, identifies new file E as the object data 342, identifies the second backup as the earliest backup 343, and identifies the second backup as the latest backup 344. Again, because object 4 was created by the second backup 320, and a backup subsequent to the second backup 320 has not yet been performed, the second backup 320 is the earliest and the latest backup to reference object 4. However, for objects 1, 2, and 3, the system may need to update the corresponding earliest and latest backups. For example, the server may determine whether a particular backup (e.g. second backup 320) references objects stored as part of a previous backup (e.g. first backup 310). In this example, the second backup 320 references objects 1, and 3, stored as part of the first backup 310, in addition to object 4 stored as part of the second backup 320. In other words, in order to perform a full recovery to the second point-in-time, the server would need to retrieve the data from objects 1 and 3, in addition to the data from object 4. Note that object 2 (e.g. object 155B) is not referenced by the second backup 320 because object 2 stores file C, which has since been deleted, and thus, not required for a full recovery to the second point-in-time. Accordingly, because objects 1, and 3 are referenced by the second backup 320, the server may update the corresponding latest backup 344 for objects 1 and 3 to the second backup 320. Accordingly, as shown, the latest backup 344 of previous entries 371A, and 373A are both updated from the first backup to the second backup as shown in entries 371B, and 373B respectively. Objects 1, and 3 now have a latest backup 344 that is the same time as object 4. As a result, the latest backup metadata for all of the objects (e.g. objects, 1, 3, and 4) referenced by the second backup 320 are synchronized (e.g. the same). Thus, the server may retrieve (or reference) this metadata to ensure that objects 155 required to perform a full recovery to the second point-in-time are not prematurely removed from the object storage.

Continuing with the storage of metadata, in response to performing the second backup 320, the server may also update the backup catalog 167 to include entry 382, which is associated with the second backup 320. As shown, entry 382 identifies the second backup as the backup ID 351, 2021-03-22 as the backup time 352, an incremental backup as the backup type 353, and objects 1, 3, and 4 (e.g. objects 155A, 155C, and 155D) as the referenced object list 354. In other words, to perform a full recovery of the client data to the point-in-time associated with the second backup 320 (e.g. restoration of files A, B, D, and E), the referenced object list 354 indicates that the server would need to retrieve the data stored in objects 1, 3, and 4 (e.g. objects 155A, 155C, and 155D). Note that object 2 (e.g. object 155B) is not part of the referenced object list 354 because object 2 stores file C, which has since been deleted, and thus, not required for a full recovery to the second point-in-time.

In some embodiments, the server may store certain changes to client data exclusively within the metadata database (e.g. object catalog 166 and/or backup catalog 167). In other words, certain changes to client data may be stored only within the metadata database and not within an object. For example, if the properties (or metadata) of client data have changed since the last backup, the server may store only the changes within the metadata database for further storage conservation. For instance, when a file has been deleted, the server may track (or record) the deletion within the metadata database and retain the file within the original object. For instance, in this example, in response to the second backup 320, the server may update the object catalog 166 and/or data catalog (e.g. data catalog 165) to indicate that file C has been deleted.

It should be noted that the server may copy or create a new instance of a catalog (e.g. object catalog 166 and/or backup catalog 167) from the previous backup and update the entries as necessary. Accordingly, each backup (e.g. full or incremental) may be associated with a particular version or instance of the catalog. Alternatively, during each backup (e.g. full or incremental), the server may add entries (e.g. cumulatively) to a single instance of the catalog. It should also be noted that catalogs may include one or more data structures (e.g. tables) that are linked together. In addition, it should be noted that although the object catalog 166 and backup catalog 167 are shown in the form of a table, any data structure or configuration is contemplated. In addition, the object catalog 166 and backup catalog 167 may be part of the same database (e.g. table) or separate databases (e.g. tables) that are linked.

FIG. 4 is a flow diagram illustrating an example method of intelligently identifying expired objects for removal according to one or more embodiments of the disclosure. Process 400 may use processing logic, which may include software, hardware, or a combination thereof. For example, process 400 may be performed by a system including one or more components described in operating environment 100 (e.g. server 120, data manager 175, etc.).

In 401, the system (e.g. server 120) may perform a first backup of client data stored on a client device (e.g. client device 110) at a first point-in-time to an object storage (e.g. object storage 150). The client data at the first point-in-time may include a first file and a second file. Accordingly, the first backup may include creating a first object within the object storage to store a backup of the first file and a second object within the object storage to store a backup of the second file. For example, with reference to diagram 300, the system may perform a first backup 310 including creating object 2 155B (e.g. first object) to store File C (e.g. backup of a first file) and object 3 155C (e.g. second object) to store File D (e.g. backup of a second file).

In 402, the system may update a metadata database (e.g. metadata database 160), in response to the first backup, to indicate the first backup as a latest backup to reference the first object, and the second object. Continuing with the example of diagram 300, the system may update the object catalog 166 to indicate the first backup 310 as the latest backup 344 to reference object 2 155B (e.g. as shown in entry 372A), and object 3 155C (e.g. as shown in entry 373A).

In some embodiments, the system may store metadata specifying the earliest backup to reference an object. Accordingly, in such embodiments, the system may also update the metadata database, in response to the first backup, to indicate the first backup as an earliest backup to reference the first object, and the second object. Continuing with the example of diagram 300, the system may update the object catalog 166 to indicate the first backup 310 as the earliest backup 343 to reference object 2 155B (e.g. as shown in entries 372A), and object 3 155C (e.g. as shown in entry 373A).

In 403, the system may perform a second backup of the client data stored on the client device at a second point-in-time to the object storage. The client data at the second point-in-time may include a new third file. Accordingly, the second backup may include creating a third object within the object storage to store a backup of the third file. Continuing with the example in diagram 300, the system may perform a second backup 320 including creating object 4 155D (e.g. third object) to store File E (e.g. backup of a third file).

In some embodiments, the first backup may be a full or incremental backup, and the second backup may be an incremental backup.

In 404, the system may update the metadata database, in response to the second backup, to indicate the second backup as the latest backup to reference the second object, and the third object. Continuing with the example of diagram 300, in response to the second backup 320, the system may update the object catalog 166 to indicate the second backup 320 as the latest backup 344 to reference object 3 155C (e.g. as shown in entry 373B), and object 4 155D (e.g. as shown in entry 374).

In some embodiments, the system may store information specifying the earliest backup to reference an object. Accordingly, in such embodiments, the system may update the metadata database, in response to the second backup, to indicate the second backup as the earliest backup to reference the third object. Continuing with the example of diagram 300, the system may update the object catalog 166 to indicate the second backup 320 as the earliest backup 343 to reference object 4 155D (e.g. as shown in entries 374).

In some embodiments, the client data at the second point-in-time may also include a deletion of the first file from the client device since the first point-time. For example, after the first backup, the first file may have been deleted from the client device by a user. Accordingly, in such a scenario, the first file would not be required for the second backup. In other words, to perform a restore to the second point-in-time, the first file would not be required. Accordingly, in some embodiments, updating the metadata database, in response to the second backup, does not include indicating the second backup as the latest backup to reference the first object in response to the deletion of the first file. Continuing with the example in diagram 300, as shown, at the second point-in-time File C (e.g. first file) has been deleted from the client device, and accordingly, after the second backup 320, the system retains the metadata in the object catalog 166 that indicates the first backup 310 as the latest backup 344 to reference the object 2 155B (e.g. entry 372A is retained).

In 405, the system may obtain an expiration time associated with the performed backups (e.g. backups 310 and 320). In some embodiments, the expiration time may be used to free up storage space on the object storage. As described, the expiration time may identify the time at which a previously performed backup, and the corresponding objects stored during such backup, are expired, and thus, candidates for removal from the object storage. For example, the expiration time may be obtained during a periodic process for identifying expired objects. For instance, the expiration time may be obtained as part of a garbage collection process.

In 406, the system may identify the first backup as expired based on a determination the first point-in-time precedes the expiration time. Continuing with the example of diagram 300, if the expiration time is 2021-03-16, the 2021-03-15 backup time 352 of the first backup 310 precedes the expiration time, and thus, the first backup 310 would be identified as expired.

In 407, the system may identify, amongst the objects created during the first backup, the first object as expired based on a determination the latest backup to reference the first object is the expired first backup. Continuing with the example of diagram 300, the system may identify objects 1, 2, and 3 as the objects created during the first backup 310, and amongst objects 1, 2, and 3, identify object 2 (e.g. the first object) as expired based on a determination the latest backup to reference object 2 is the expired first backup 310 as shown in the object catalog 166 after performing the second backup 320. In some embodiments, the determination may be made by accessing the object catalog 166 and retrieving the latest backup 344 values for each of the objects created during the expired backup, which in this case was the first backup 310. In other words, the system does not have to access the objects themselves, and instead, may make such a determination exclusively on the information retrieved from the metadata database (e.g. object catalog 166). For example, as shown in diagram 300, after the second backup 320, only object 2 has a latest backup 344 value of an expired backup (e.g. first backup 310).

In some embodiments, when the earliest backup to reference an object is maintained as part of the metadata, the system may also leverage this information to determine whether an object may be removed. For example, in some embodiments, identifying the first object as expired may be further based on a determination the first backup is both the earliest backup to reference the first object and the latest backup to reference the first object. Continuing with the example of diagram 300, the system may identify object 2 (e.g. first object) as expired based on a determination the first backup 310 (e.g. expired backup) is both the earliest backup 343 and the latest backup 344 to reference object 2 as shown in the object catalog 166 after performing the second backup 320. In some embodiments, the determination may be made by accessing the object catalog 166 and retrieving the earliest backup 343 and latest backup 344 values for each of the objects.

In 408, the system may mark the first object for re-tiering or deletion, in response to identifying the first object as expired. Continuing with the example of diagram 300, the system may mark object 2 (e.g. object 155B) for removal, and in response, delete object 2 or re-tier object 2 by moving object 2 from a first storage tier (e.g. storage tier 1 151) to a second, lower cost, storage tier (e.g. storage tier 2 152).

Figure 5:
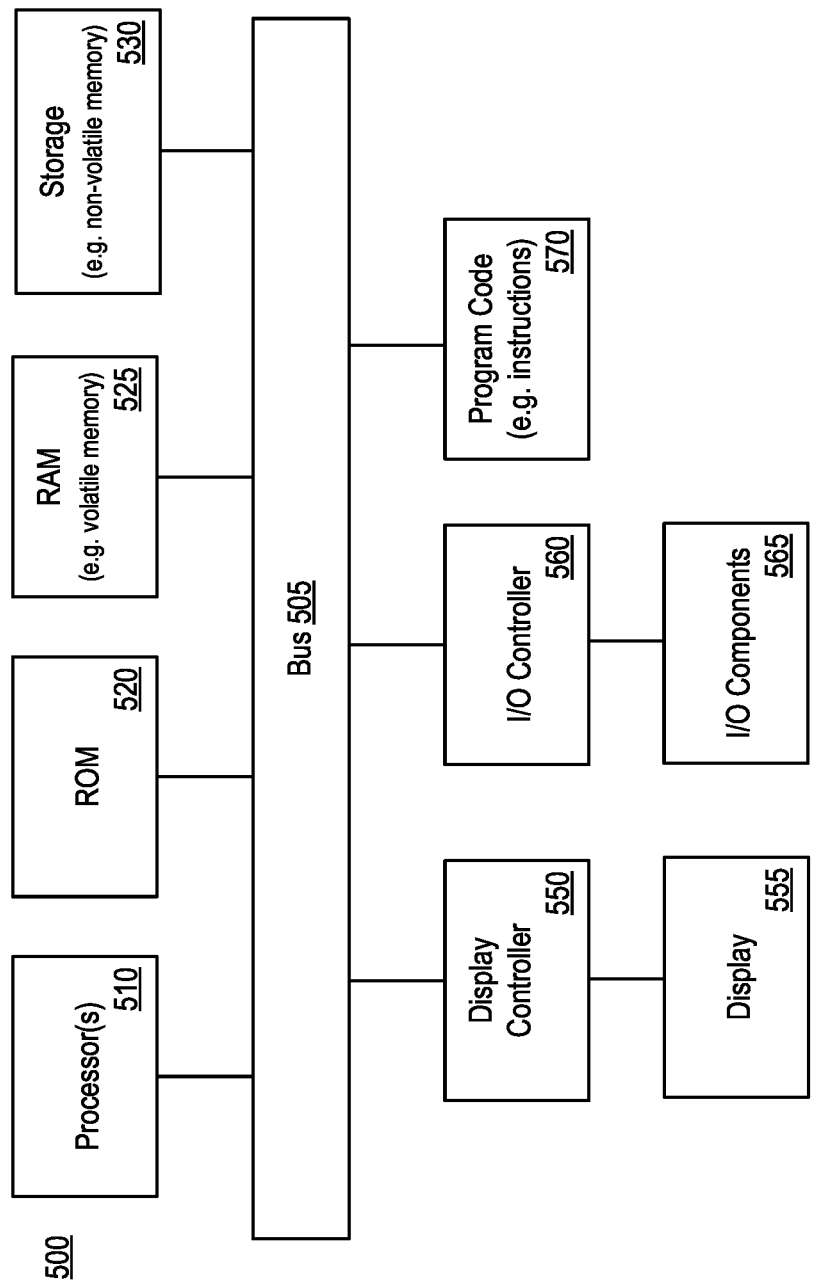
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, data manager 175, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
    one or more processors; and
    a non-transitory computer-readable medium storing a plurality of instructions, which when executed, cause the one or more processors to:
    perform a first backup of client data stored on a client device at a first point-in-time to an object storage, the client data at the first point-in-time including a first file and a second file, the first backup including creating a first object within the object storage to store a backup of the first file and a second object within the object storage to store a backup of the second file;
    update a metadata database, in response to the first backup, to indicate the first backup as a latest backup to reference the first object, and the second object;
    perform a second backup of the client data stored on the client device at a second point-in-time to the object storage, the client data at the second point-in-time including a new third file, the second backup including creating a third object within the object storage to store a backup of the third file;
    update the metadata database, in response to the second backup, to indicate the second backup as the latest backup to reference the second object, and the third object;
    obtain an expiration time associated with the performed backups, the expiration time used to free up storage space on the object storage;
    identify the first backup as expired based on a determination the first point-in-time precedes the expiration time; and
    identify, amongst the objects created during the first backup, the first object as expired based on a determination the latest backup to reference the first object is the expired first backup.

2. The system of claim 1, wherein the client data at the second point-in-time further includes a deletion of the first file from the client device since the first point-in-time.

3. The system of claim 2, wherein updating the metadata database, in response to the second backup, does not include indicating the second backup as the latest backup to reference the first object in response to the deletion of the first file.

4. The system of claim 1, wherein the plurality of instructions, when executed, further cause the one or more processors to:
    update the metadata database, in response to the first backup, to indicate the first backup as an earliest backup to reference the first object, and the second object; and
    update the metadata database, in response to the second backup, to indicate the second backup as the earliest backup to reference the third object.

5. The system of claim 4, wherein identifying the first object as expired is further based on a determination the first backup is both the earliest backup to reference the first object and the latest backup to reference the first object.

6. The system of claim 1, wherein the plurality of instructions, when executed, further cause the one or more processors to:

mark the first object for re-tiering or deletion, in response to identifying the first object as expired.

7. The system of claim 1, wherein the second backup is an incremental backup.

8. A method comprising:
performing a first backup of client data stored on a client device at a first point-in-time to an object storage, the client data at the first point-in-time including a first file and a second file, the first backup including creating a first object within the object storage to store a backup of the first file and a second object within the object storage to store a backup of the second file;
updating a metadata database, in response to the first backup, to indicate the first backup as a latest backup to reference the first object, and the second object;
performing a second backup of the client data stored on the client device at a second point-in-time to the object storage, the client data at the second point-in-time including a new third file, the second backup including creating a third object within the object storage to store a backup of the third file;
updating the metadata database, in response to the second backup, to indicate the second backup as the latest backup to reference the second object, and the third object;
obtaining an expiration time associated with the performed backups, the expiration time used to free up storage space on the object storage;
identifying the first backup as expired based on a determination the first point-in-time precedes the expiration time; and
identifying, amongst the objects created during the first backup, the first object as expired based on a determination the latest backup to reference the first object is the expired first backup.

9. The method of claim 8, wherein the client data at the second point-in-time further includes a deletion of the first file from the client device since the first point-in-time.

10. The method of claim 9, wherein updating the metadata database, in response to the second backup, does not include indicating the second backup as the latest backup to reference the first object in response to the deletion of the first file.

11. The method of claim 8, further comprising:
updating the metadata database, in response to the first backup, to indicate the first backup as an earliest backup to reference the first object, and the second object; and
updating the metadata database, in response to the second backup, to indicate the second backup as the earliest backup to reference the third object.

12. The method of claim 11, wherein identifying the first object as expired is further based on a determination the first backup is both the earliest backup to reference the first object and the latest backup to reference the first object.

13. The method of claim 8, further comprising:
marking the first object for re-tiering or deletion, in response to identifying the first object as expired.

14. The method of claim 8, wherein the second backup is an incremental backup.

15. A computer program product comprising a non-transitory computer-readable medium having a computer-readable program code embodied therein to be executed by one or more processors, the program code including instructions to:
perform a first backup of client data stored on a client device at a first point-in-time to an object storage, the client data at the first point-in-time including a first file and a second file, the first backup including creating a first object within the object storage to store a backup of the first file and a second object within the object storage to store a backup of the second file;
update a metadata database, in response to the first backup, to indicate the first backup as a latest backup to reference the first object, and the second object;
perform a second backup of the client data stored on the client device at a second point-in-time to the object storage, the client data at the second point-in-time including a new third file, the second backup including creating a third object within the object storage to store a backup of the third file;
update the metadata database, in response to the second backup, to indicate the second backup as the latest backup to reference the second object, and the third object;
obtain an expiration time associated with the performed backups, the expiration time used to free up storage space on the object storage;
identify the first backup as expired based on a determination the first point-in-time precedes the expiration time; and
identify, amongst the objects created during the first backup, the first object as expired based on a determination the latest backup to reference the first object is the expired first backup.

16. The computer program product of claim 15, wherein the client data at the second point-in-time further includes a deletion of the first file from the client device since the first point-in-time.

17. The computer program product of claim 16, wherein updating the metadata database, in response to the second backup, does not include indicating the second backup as the latest backup to reference the first object in response to the deletion of the first file.

18. The computer program product of claim 15, wherein the program code includes further instructions to:
update the metadata database, in response to the first backup, to indicate the first backup as an earliest backup to reference the first object, and the second object; and
update the metadata database, in response to the second backup, to indicate the second backup as the earliest backup to reference the third object.

19. The computer program product of claim 18, wherein identifying the first object as expired is further based on a determination the first backup is both the earliest backup to reference the first object and the latest backup to reference the first object.

20. The computer program product of claim 15, wherein the program code includes further instructions to:
mark the first object for re-tiering or deletion, in response to identifying the first object as expired.

* * * * *